(12) United States Patent
Buerger

(10) Patent No.: US 7,756,790 B2
(45) Date of Patent: Jul. 13, 2010

(54) LIFE SETTLEMENT/SETTLEMENT WITH PAID-UP POLICY SYSTEM AND METHOD

(75) Inventor: Alan H. Buerger, Wyndmoor, PA (US)

(73) Assignee: Coventry First LLC, Fort Washington, PA (US)

( * ) Notice: Subject to any disclaimer, the term of this patent is extended or adjusted under 35 U.S.C. 154(b) by 1232 days.

(21) Appl. No.: 11/062,587

(22) Filed: Feb. 23, 2005

(65) Prior Publication Data

US 2005/0187869 A1 Aug. 25, 2005

Related U.S. Application Data

(60) Provisional application No. 60/546,211, filed on Feb. 23, 2004.

(51) Int. Cl.
 *G06Q 40/00* (2006.01)
(52) U.S. Cl. .............................. 705/41; 705/4
(58) Field of Classification Search .............. 705/35–45
 See application file for complete search history.

(56) References Cited

U.S. PATENT DOCUMENTS

| | | | |
|---|---|---|---|
| 4,876,648 A | 10/1989 | Lloyd | |
| 5,673,402 A | 9/1997 | Ryan | |
| 5,752,236 A * | 5/1998 | Sexton et al. | 705/4 |
| 5,907,828 A | 5/1999 | Meyer | |
| 5,926,800 A | 7/1999 | Baronowski et al. | |
| 5,991,744 A * | 11/1999 | DiCresce | 705/36 R |
| 6,119,093 A | 9/2000 | Walker | |
| 6,134,536 A | 10/2000 | Shepherd | |
| 6,304,859 B1 | 10/2001 | Ryan et al. | |
| 6,393,405 B1 | 5/2002 | Vicente | |
| 6,578,016 B1 | 6/2003 | Trankina et al. | |
| 6,594,635 B1 | 7/2003 | Erlanger | |
| 6,937,990 B1 | 8/2005 | Walker | |
| 6,950,805 B2 | 9/2005 | Kavanaugh | |
| 6,963,852 B2 | 11/2005 | Koresko | |
| 6,999,935 B2 * | 2/2006 | Parankirinathan | 705/4 |
| 7,158,950 B2 | 1/2007 | Snyder | |
| 7,240,017 B2 | 7/2007 | Labelle et al. | |
| 7,249,037 B2 | 7/2007 | Koppes et al. | |
| 7,249,077 B2 | 7/2007 | Williams et al. | |
| 7,324,950 B2 | 1/2008 | Sherman | |
| 7,343,333 B2 | 3/2008 | Menke | |
| 7,376,609 B2 | 5/2008 | Clark | |
| 7,676,388 B2 * | 3/2010 | Parankirinathan | 705/4 |
| 2001/0034619 A1 | 10/2001 | Sherman | |

(Continued)

OTHER PUBLICATIONS

Kirby, Scott, "Advanced Settlements,LLC Foresess Fourth Quarter Increases in Life Settlement Transactions", PR Newswire, New York: Sep. 8, 2003. p. 1.*

(Continued)

*Primary Examiner*—James P Trammell
*Assistant Examiner*—Mohammad Z Shaikh
(74) *Attorney, Agent, or Firm*—Dickstein Shapiro LLP

(57) ABSTRACT

A method and system for structuring a life settlement with a paid-up policy transaction. An existing insurance policy holder exchanges an existing insurance policy for a paid-up insurance policy or life insurance group certificate purchased by a buyer on a secondary market. The policy holder could also exchange its policy for being named as a beneficiary of a second insurance policy purchased by a buyer on a secondary market.

61 Claims, 6 Drawing Sheets

300

U.S. PATENT DOCUMENTS

| | | | |
|---|---|---|---|
| 2002/0046067 A1 | 4/2002 | Kraehenbuehl et al. | |
| 2002/0165740 A1* | 11/2002 | Saunders | 705/4 |
| 2003/0023544 A1* | 1/2003 | Chodes | 705/38 |
| 2003/0023546 A1 | 1/2003 | Shepherd | |
| 2003/0074232 A1 | 4/2003 | Lee | |
| 2003/0083975 A1 | 5/2003 | O'Grady et al. | |
| 2003/0088444 A1 | 5/2003 | Garbin et al. | |
| 2003/0105690 A1 | 6/2003 | Brown et al. | |
| 2003/0105700 A1 | 6/2003 | Brown et al. | |
| 2003/0110061 A1 | 6/2003 | Lakenbach et al. | |
| 2003/0130935 A1 | 7/2003 | Brown et al. | |
| 2004/0019506 A1 | 1/2004 | Struchtemeyer et al. | |
| 2004/0030589 A1* | 2/2004 | Leisher et al. | 705/4 |
| 2004/0064391 A1* | 4/2004 | Lange | 705/36 |
| 2004/0078242 A1* | 4/2004 | Weiss et al. | 705/4 |
| 2004/0088201 A1 | 5/2004 | Lang | |
| 2004/0117289 A1 | 6/2004 | McNealy et al. | |
| 2004/0128233 A1 | 7/2004 | Jarzmik | |
| 2004/0148202 A1* | 7/2004 | Siefe et al. | 705/4 |
| 2004/0167807 A1 | 8/2004 | Fitzsimmons et al. | |
| 2004/0176989 A1* | 9/2004 | Darr | 705/4 |
| 2004/0177021 A1 | 9/2004 | Carlson et al. | |
| 2004/0181436 A1 | 9/2004 | Lange | |
| 2004/0236612 A1 | 11/2004 | Heusinkveld et al. | |
| 2004/0267647 A1* | 12/2004 | Brisbois | 705/35 |
| 2005/0010453 A1* | 1/2005 | Terlizzi et al. | 705/4 |
| 2005/0033611 A1 | 2/2005 | Phelps | |
| 2005/0071205 A1 | 3/2005 | Terlizzi et al. | |
| 2005/0144045 A1* | 6/2005 | Corsi | 705/4 |
| 2005/0182670 A1 | 8/2005 | Burgess | |
| 2005/0187869 A1 | 8/2005 | Bierger | |
| 2005/0192849 A1 | 9/2005 | Spalding, Jr. | |
| 2005/0203822 A1 | 9/2005 | Shea et al. | |
| 2005/0216316 A1 | 9/2005 | Brisbois et al. | |
| 2005/0222941 A1 | 10/2005 | Tull, Jr. | |
| 2005/0234747 A1 | 10/2005 | Kavanaugh | |
| 2005/0234791 A1 | 10/2005 | Krasnerman | |
| 2005/0240449 A1 | 10/2005 | Gore et al. | |
| 2005/0288969 A1 | 12/2005 | Schuver et al. | |
| 2005/0289049 A1 | 12/2005 | Schuver et al. | |
| 2006/0031151 A1 | 2/2006 | Dorr | |
| 2006/0041455 A1 | 2/2006 | Dehais | |
| 2006/0059020 A1 | 3/2006 | Davidson | |
| 2006/0064331 A1 | 3/2006 | Odermott et al. | |
| 2006/0080148 A1 | 4/2006 | Koresko | |
| 2006/0100913 A1 | 5/2006 | Ward | |
| 2006/0111949 A1 | 5/2006 | Krasnerman | |
| 2006/0122871 A1 | 6/2006 | Cowley | |
| 2006/0136313 A1 | 6/2006 | Driver | |
| 2006/0136316 A1 | 6/2006 | Shiau | |
| 2006/0143055 A1 | 6/2006 | Loy | |
| 2006/0143099 A1 | 6/2006 | Partlow | |
| 2006/0143113 A1 | 6/2006 | Bercovitz | |
| 2006/0143114 A1 | 6/2006 | Schuver | |
| 2006/0143115 A1 | 6/2006 | Eder | |
| 2006/0155588 A1 | 7/2006 | Kibar et al. | |
| 2006/0155621 A1 | 7/2006 | Bell | |
| 2006/0178979 A1 | 8/2006 | Levine | |
| 2006/0184442 A1 | 8/2006 | Krasnerman | |
| 2006/0190395 A1 | 8/2006 | Solomon | |
| 2006/0200406 A1 | 9/2006 | Burke | |
| 2006/0206415 A1 | 9/2006 | Ross | |
| 2006/0206417 A1 | 9/2006 | Selby | |
| 2006/0206438 A1 | 9/2006 | Sakaue | |
| 2006/0287893 A1 | 12/2006 | Weiss et al. | |
| 2006/0287949 A1 | 12/2006 | Silverman | |
| 2007/0011064 A1 | 1/2007 | Edwards | |
| 2007/0016455 A1 | 1/2007 | Ryan | |
| 2007/0016516 A1 | 1/2007 | Mountford | |
| 2007/0022034 A1 | 1/2007 | Lenhard | |
| 2007/0033119 A1 | 2/2007 | Dubitsky et al. | |
| 2007/0050217 A1 | 3/2007 | Holden | |
| 2007/0055617 A1 | 3/2007 | Garcia et al. | |
| 2007/0055620 A1 | 3/2007 | Garcia et al. | |
| 2007/0094053 A1 | 4/2007 | Samuels | |
| 2007/0094054 A1 | 4/2007 | Crabb | |
| 2007/0094125 A1 | 4/2007 | Izyayev | |
| 2007/0094127 A1 | 4/2007 | Izyayev | |
| 2007/0100727 A1 | 5/2007 | Multer et al. | |
| 2007/0106589 A1 | 5/2007 | Schirripa | |
| 2007/0118393 A1 | 5/2007 | Rosen et al. | |
| 2007/0129972 A1 | 6/2007 | Labelle et al. | |
| 2007/0130035 A1 | 6/2007 | Carden | |
| 2007/0136164 A1 | 6/2007 | Roti et al. | |
| 2007/0150318 A1 | 6/2007 | Pickard et al. | |
| 2007/0156558 A1 | 7/2007 | Wolzenski et al. | |
| 2007/0156559 A1 | 7/2007 | Wolzenski et al. | |
| 2007/0162380 A1 | 7/2007 | Conroy | |
| 2007/0168268 A1 | 7/2007 | Lange | |
| 2007/0185741 A1 | 8/2007 | Hebron | |
| 2007/0214071 A1 | 9/2007 | Stone | |
| 2007/0214072 A1 | 9/2007 | Stone | |
| 2007/0226015 A1 | 9/2007 | Lutnick | |
| 2007/0226123 A1 | 9/2007 | Lutnick | |
| 2007/0239583 A1 | 10/2007 | Williams | |
| 2007/0250353 A1 | 10/2007 | Schwartz | |
| 2007/0250427 A1 | 10/2007 | Robinson | |
| 2007/0288262 A1 | 12/2007 | Sakaue | |
| 2007/0299760 A1 | 12/2007 | Lange | |
| 2008/0040166 A1 | 2/2008 | Foti | |
| 2008/0071584 A1 | 3/2008 | Parankirinathan | |
| 2008/0082371 A1 | 4/2008 | Phillips | |
| 2008/0091594 A1 | 4/2008 | Abramson | |
| 2008/0097797 A1 | 4/2008 | Morris | |
| 2008/0103840 A1 | 5/2008 | Luedtke | |
| 2008/0126138 A1 | 5/2008 | Cherney | |
| 2008/0133279 A1 | 6/2008 | Pollock | |
| 2008/0147447 A1 | 6/2008 | Roche | |
| 2008/0167903 A1 | 7/2008 | Hall | |
| 2008/0167904 A1 | 7/2008 | Rudich | |
| 2008/0168000 A1 | 7/2008 | Dunn | |
| 2008/0172260 A1 | 7/2008 | Thacker | |
| 2008/0172325 A1 | 7/2008 | Lange | |
| 2008/0177582 A1 | 7/2008 | O'Brien | |
| 2008/0183507 A1 | 7/2008 | Lutnick | |
| 2008/0183510 A1 | 7/2008 | Pollock | |
| 2008/0183636 A1 | 7/2008 | Walsh | |

OTHER PUBLICATIONS

Hovey, Juan "Financing and Insurance; Selling Your Life Insurance Policy can help ensure Business Liquidity", Los Angeles Times, Apr. 30, 2001 pg. C.3.*

"Living Benefits Launches New Era in the Life Settlement Industry", PR Newswire. New York: Jan. 4, 2002. p. 1.*

Lian, Phillip; Soldinger, Evan, "Converting a term policy for a life settlement", Broker World. Jul. 2003. vol. 23, Iss 7 p. 20.*

Juan Hovey, Financing and Insurance; Selling your life insurance policy can help ensure business liquidty; Los Angeles Times, Calif: Apr. 30, 2001. p. C.3.*

"Advanced Settlements Enters Strategic Alliance with Quantum Alliance Corp. (QA3)", PR Newswire. New York: Feb. 18, 2004. p. 1.*

Ron Panko, "Cashing Out.", Best's Review, vol. 102, Issue 12, Apr. 1, 2002, US.*

Provada Insurance Services, Inc., "Life Insurance Premium Financing," Client Guide.

Provada Insurance Services, Inc., "Premium Financing," Client Profile, 2004, pp. 1-2.

Provada Insurance Servides, Inc., "Premium Financing," Sales Strategy, 2004, pp. 1-3.

"Life Insurance and Life Annuities Backed Charitable Securities", Series A Investor Certificates, UBS Investment Bank, Apr. 2004.

Strom, Stephanie, "Charities Look to Benefit from a New York Twist on Life Insurance", The New York Times, Jun. 5, 2004.

* cited by examiner

LIFE SETTLEMENT/SETTLEMENT WITH PAID-UP POLICY SYSTEM AND METHOD This application claims the benefit of provisional application Ser. No. 60/546,211 filed Feb. 23, 2004, the entire contents of which are hereby incorporated by reference.

FIELD OF THE INVENTION

The invention relates to life insurance transactions, specifically life settlement transactions and methods and systems for administering and managing those transactions.

BACKGROUND OF THE INVENTION

With the advent of a secondary market for life insurance policies, policy owners have an option in their management of life insurance polices. Due to various reasons such as retirement, health, changes in estate value, estate taxes or premium costs, the owner of a policy can now choose to sell the policy on a secondary market instead of surrendering the policy to the issuing insurer or allowing the policy to lapse.

FIG. 1 illustrates a typical insurance transaction flow between the policy holder 105 and the insurance company 103. An Owner/Holder 105 first purchases a life insurance policy, as signified by the arrow 110 from an insurer (Insurance Company 103) on the life of an individual. The policy has a designated beneficiary of the owner's choosing. The policy has a certain face value, for example nine million dollars, to be received by the policy's beneficiary as a death benefit upon the death of the individual insured under the policy. The beneficiary may be the Owner 105 or the individual whose life is insured by the policy (not shown), or another person designated by the Owner 105. The person whose life is insured may be the Owner 105 or another person for whom the Owner 105 has an insurable interest. At step 120 the Owner 105 of the policy pays a premium amount, for example five hundred dollars per month to the insurance company 103, for the policy over a certain period of time based on various factors such as age and health. As the Owner 105 of the policy pays the premium 120, a cash value for the policy may accrue if the amount of premium exceeds the policy's cost of the insurance. This cash value could vary depending upon the type of insurance policy, for example, term, whole life or universal life insurance, that is obtained. The policy may be redeemed by the Owner 105 for the cash value before the death of the insured. The cash value may also provide an additional amount of death benefit.

A life settlement is a sale of an existing life insurance policy by the Owner 105 of the policy to a buyer (Buyer), who is not the issuer of the policy. Typically, the purchase price for the policy is less than the face value for the policy, but more than its cash value.

FIG. 1A illustrates a typical a life settlement transaction 100. The life settlement transaction is designed to meet the insured's financial needs. Specifically, as the Owner 105 pays the insurance premium over a span of for example 30 years, various situations may arise in which the Owner 105 would need immediate access to cash, such as for repayment of loans, for retirement, for buying a business, for paying for healthcare, or when he otherwise would decide that he did not wish to continue making premium payments. Accordingly, in the life settlement transaction at step 130, the Owner 105 would sell the policy to a Buyer 101 for a designated price, for example three million dollars. At step 140, upon such an agreement, the Owner 105 would assign the Policy to the Buyer 101, and in exchange, the Buyer 101 pays the Owner 105 in cash. As a consequence, the Buyer 101 becomes a holder ("Holder") of the policy. In addition, at step 150, the Buyer 101 begins paying the premiums for the Policy and at step 160 the Insurance Company 103 maintains the Policy but converts its owner to a Buyer 101. As such, the Owner's 105 liquidity is increased. Upon the death of the individual whose life is insured by the Policy, the Buyer 101 receives the face value amount of the Policy, nine million dollars.

However, such a transaction will usually have unfavorable tax implications because the cash payment from Buyer 101 to Holder 105 is subject to capital gains and/or income taxes. Accordingly, there is a need and desire for a life settlement arrangement that allows the Holder 105 to sell his policy while reducing tax liability. In addition, such a transaction will leave the Holder 105 with less insurance than he may desire. Accordingly, there is a need and desire for a life settlement arrangement that allows a Holder 105 to continue to hold an insurance policy, albeit with a lower face amount.

Moreover, there is a need in the art for a computer system and a computerized method that manages and administers life settlement transactions in order that substantial numbers of settlements can be efficiently implemented and administered.

SUMMARY

The present system and method involves life settlement transactions with a paid-up life insurance policy (SWAPP) that allows a holder to sell his/her existing life insurance policy on the secondary market while minimizing tax liability for such a transaction and continuing to have some level of life insurance.

In a first embodiment, a person purchases a first insurance policy from an insurer. The first policy has a death benefit and names the person as the beneficiary. Subsequently, the person assigns the first policy to a buyer. The buyer then purchases a second insurance policy from an insurer and names the person as beneficiary of the second insurance policy. The second policy is paid-up and has a death benefit that is less than the death benefit of the first policy. The buyer is made a beneficiary of the first policy and receives the death benefit of the first policy upon the death of the individual whose life is insured. The buyer may be any individual or other entity.

In a second embodiment, a person purchases a first insurance policy from an insurer, and subsequently assigns the first policy to a buyer. The buyer then causes a paid-up second insurance policy to issue to the person with a death benefit that is less than the first policy. The buyer receives the death benefit of the first policy upon the death of the individual whose life is insured.

In a third embodiment, a person purchases a first insurance policy from an insurer. In conjunction with the sale, the seller joins a life insurance consumer association or other association having similar attributes and receives a paid-up group life insurance certificate under the association's group policy it has obtained from a life insurance carrier for its members. The buyer receives the death benefit of the first policy upon the death of the individual whose life is insured.

The invention can be implemented manually or electronically through a network of interconnected or accessible computers. The present invention implements a method of transacting a life settlement agreement comprising: receiving an assigned first insurance policy from a policy holder; purchasing a second insurance policy from an insurance company; naming said policy holder as a beneficiary of said second insurance policy; and collecting a death benefit of said first insurance policy upon an insured under the assigned first insurance policy being deceased. This method further comprises assigning a second insurance policy to said policy holder. This method allows the policy holder to name another person as the beneficiary of the second policy.

Further, the present invention implements a method of transacting a life settlement agreement comprising: receiving an assigned first insurance policy from a policy holder; purchasing a second insurance policy from an insurance company; assigning said second insurance policy to said policy holder; and collecting a death benefit of said first insurance policy upon said policy holder being deceased.

The present invention also implements a method of transacting a life settlement agreement comprising: receiving an assigned first insurance policy from a policy holder, wherein said first insurance policy is placed in a trust account; purchasing a group insurance policy from an insurance company on behalf of members of an association owning said trust account; assigning a life insurance group certificate to said policy holder; and collecting a death benefit of said first insurance policy upon said policy holder being deceased.

The present invention implements a computer based system for transacting a life settlement agreement, said system comprising: a computer processor for processing data; a storage means for storing data on and reading data from a storage medium; a computer program, said program implementing the steps of: managing receipt of an assigned first insurance policy from a policy holder; purchasing a second insurance policy from an insurance company; naming said policy holder as a beneficiary of said second insurance policy; and managing a collection of a death benefit of said first insurance policy upon an insured under the assigned first policy being deceased.

BRIEF DESCRIPTION OF THE DRAWINGS

These and other features and advantages of the invention will be better understood from the following detailed description, which is provided in connection with the accompanying drawings, in which.

DETAILED DESCRIPTION OF PREFERRED EMBODIMENTS

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized without departing from the spirit and scope of the present invention.

Figure 1:
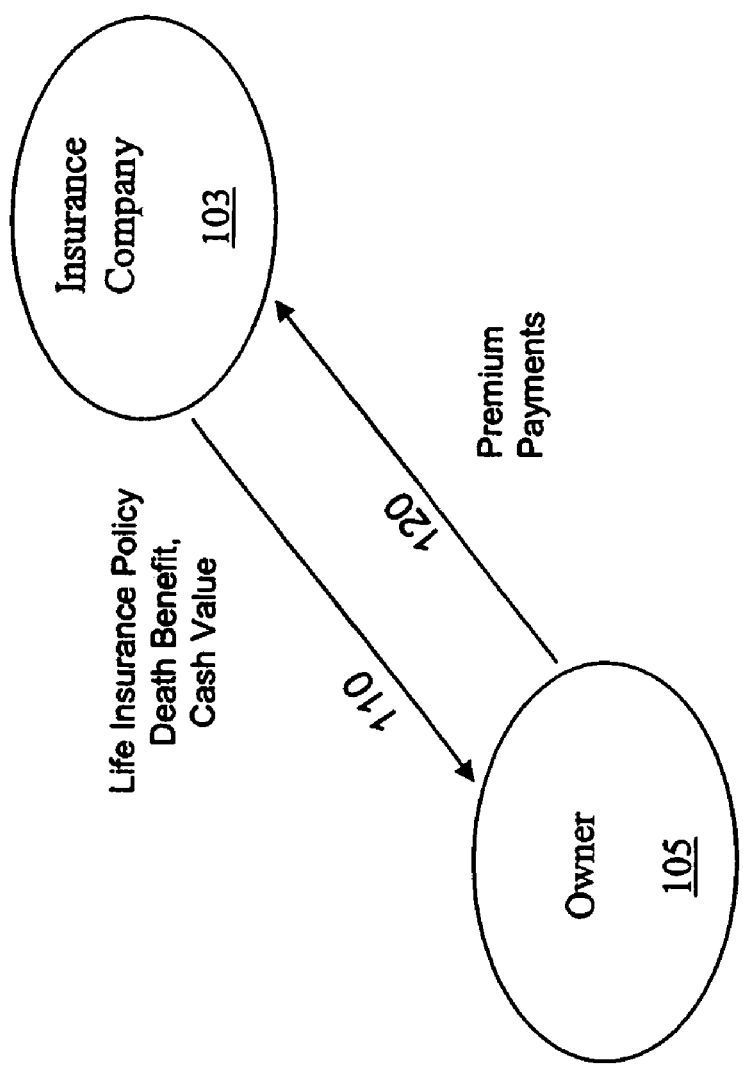
FIG. 1 is a flow chart illustrating a conventional life insurance transaction.
Figure 1A:
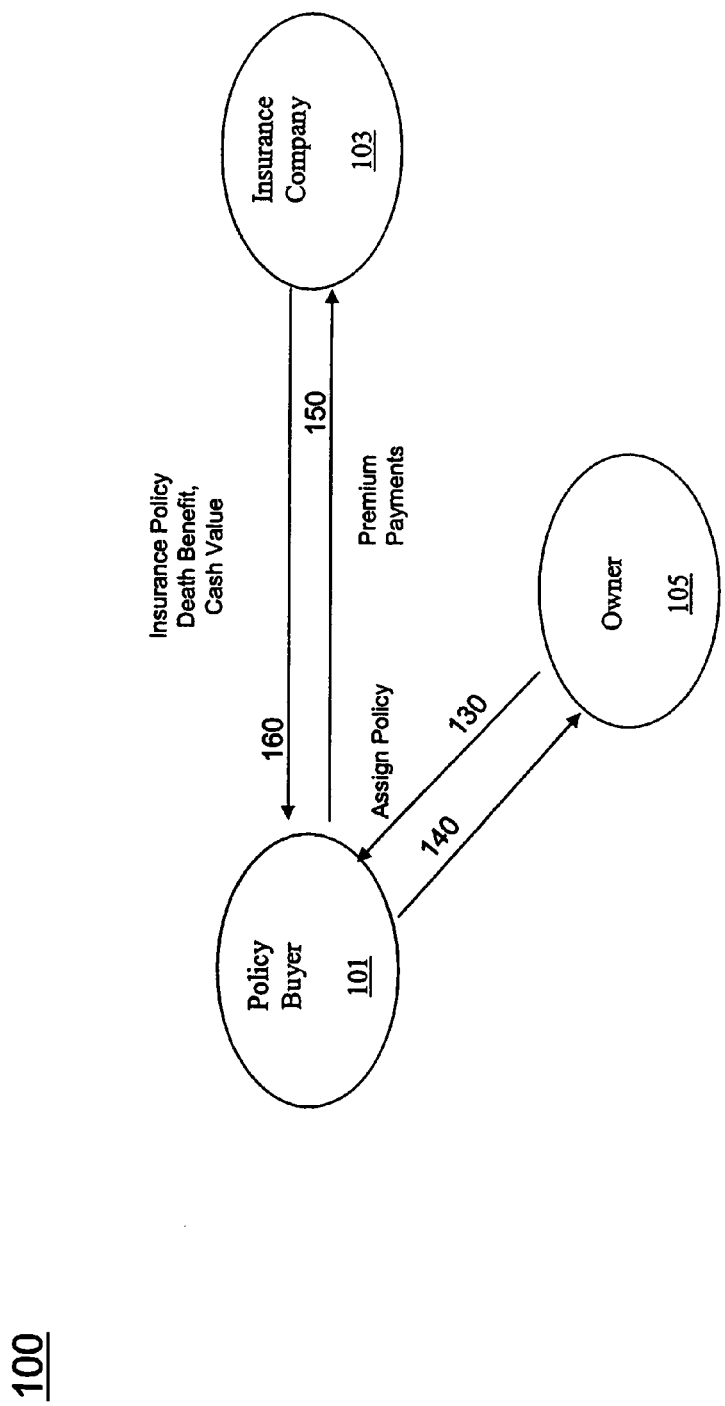
FIG. 1A is a flow chart illustrating a conventional life settlement transaction.
Figure 2:
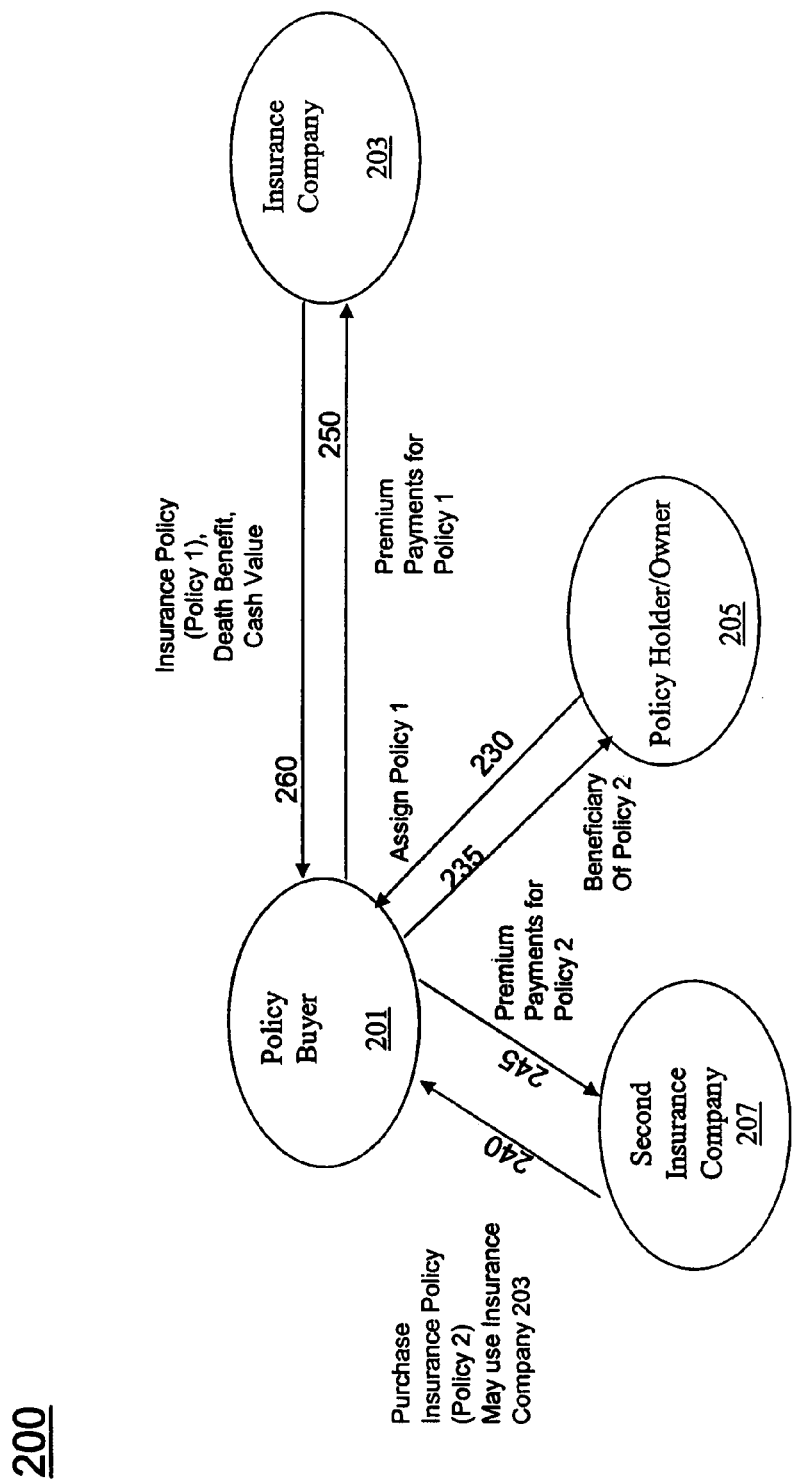
FIG. 2 is a flow chart illustrating a first embodiment of a life settlement transaction according to the present invention.

FIG. 2 illustrates a life settlement transaction 200 according to a first exemplary embodiment of the invention. The life settlement transaction is based on a life settlement transaction 100 of FIG. 1A; however, the Policy Holder/Owner 205 ("Owner") does not receive cash upon the assignment of the policy to a Policy Buyer 201 ("Buyer"). Rather, the Owner 205 receives the death benefit under a newly purchased second policy.

The Owner 205 purchases a life insurance policy (Policy 1) from an Insurance Company 203. Subsequently, in step 230, the Owner 205 reaches an agreement with a Buyer 201, and the Owner 205 assigns Policy 1 to the Buyer 201.

In exchange for this assignment, the Buyer 201 at step 240 purchases a second insurance policy (Policy 2) from a Second Insurance Company 207 and then names the Owner 205 at step 235 as the beneficiary of Policy 2. The amount of insurance is calculated by the Buyer using conventionally known actuarial information. By way of example, the following illustration provides details about calculating the correct amount of insurance:

| | |
|---|---|
| Jan. 1, 1990 | John Smith Purchases Life Insurance Policy from XYZ Life Insurance Company as follows: |
| | Owner      John Smith |
| | Insured      John Smith |
| | Beneficiary      Jane Smith |
| | Death Benefit      $9,000,000 |
| | Premiums      $20,000/month for 30 years |
| | Cash Surrender Value      $0 |
| Next 10 years | John pays $20,000 per month to XYZ Life Insurance Company |
| Jan. 1, 2000 | John Smith no longer needs the full $9,000,000 of death benefit and cannot afford the $20,000/month premium payment |
| | Details of his insurance policy with XYZ Life Insurance company are now as follows |
| | Owner      John Smith |
| | Insured      John Smith |
| | Beneficiary      Jane Smith |
| | Death Benefit      $9,000,000 |
| | Premiums      $20,000/month for 20 years |
| | Cash Surrender Value      $1,000,000 |
| Jan. 2, 2000 | A buyer is willing to purchase the XYZ Life Insurance policy for $2,000,000. |
| | Due to the tax implications of receiving a cash payment, and John's continued need for death benefit protection, the buyer agrees to provide John with a new paid up policy as consideration for the assignment of XYZ policy rather than a cash payment. |
| | John assigns the XYZ Life Insurance policy to Buyer. |
| | Buyer purchases a new guaranteed paid up policy from ABC Life Insurance Company for a single payment of $2,000,000 |
| | No cash consideration is paid to John by Buyer. |
| | The details of the two life insurance policies are as follows. |

| | XYZ Life Insurance Policy | ABC Life Insurance Policy |
|---|---|---|
| Owner | Buyer | Buyer |
| Insured | John Smith | John Smith |
| Beneficiary | Buyer | Jane Smith |
| Death Benefit | $9,000,000 | $6,000,000 |
| Premiums | $20,000/month for 20 years | One payment at purchase of $2,000,000 |
| Cash Surrender Value | $1,000,000 | $1,500,000 |

-continued

| | |
|---|---|
| Next 5 Years | Buyer continues paying $20,000/month to XYZ Life Insurance company |
| | John Smith pays no premiums to either insurance company. |
| Jan. 1, 2005 | John Smith Dies |
| | XYZ Life Insurance Company pays $9,000,000 to Buyer |
| | ABC Life Insurance company pays $6,000,000 to Jane Smith |
| | Transaction terminates. |

The Owner 205 thus eliminates the tax implications related to a cash purchase, which is required to be reported as taxable income. Instead, the Owner 205 is the beneficiary of the second insurance policy, for which the Buyer 201 pays the premium payments to the Insurance Company 207 at step 245. Accordingly, upon the death of the individual whose life is insured at step 235, the Owner 205 receives the death benefit payment from Policy 2 where it would not have otherwise had there been a lapse or surrender of Policy 1. Also, at Step 260 the Buyer 201 receives the death benefit payment from Policy 1, which is greater than the death benefit payment of Policy 2.

Figure 3:
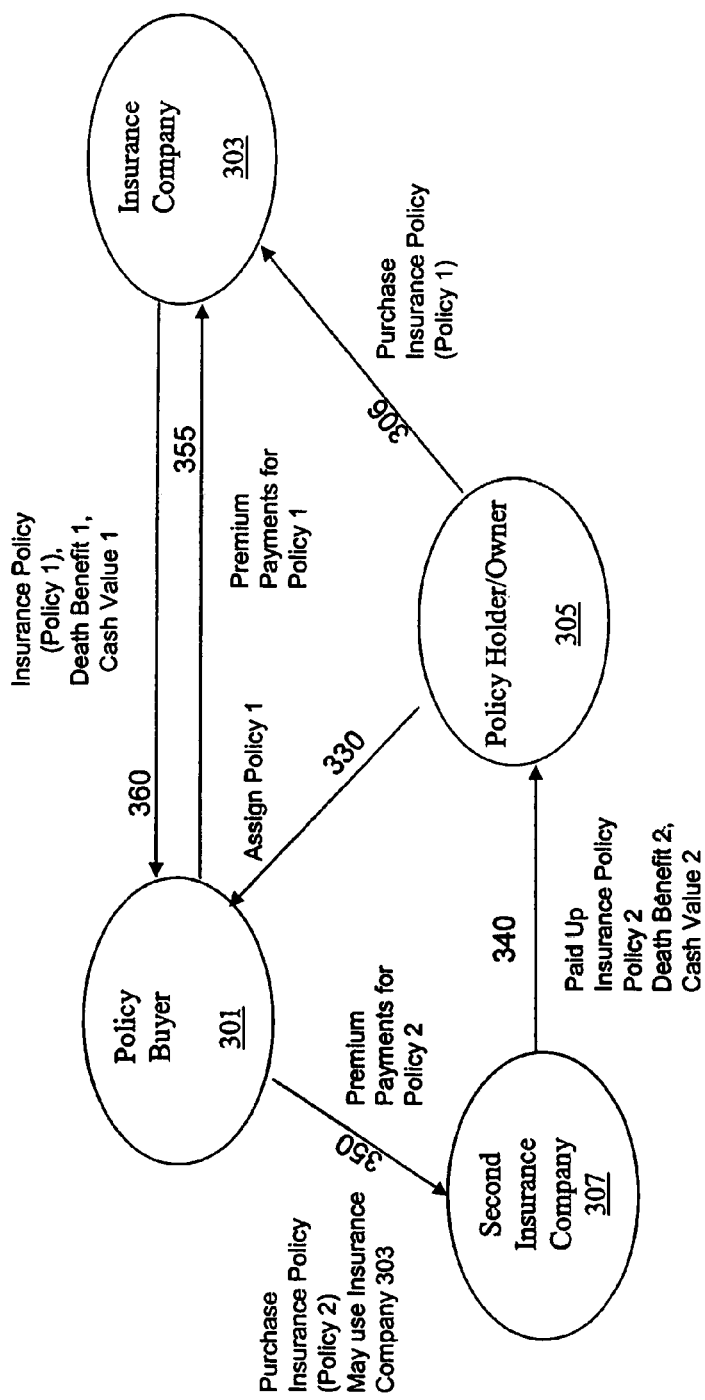
FIG. 3 is a flow chart illustrating a second embodiment of a life settlement transaction according to the present invention.

FIG. 3 illustrates a life settlement transaction 300 according to a second exemplary embodiment of the invention. The life settlement transaction is similar to life settlement transaction 200; however, the Owner 305 receives a paid-up insurance policy (Policy 2) 340 instead of being a beneficiary of Policy 2, as provided in FIG. 1. The Owner 305 purchases a life insurance policy (Policy 1) from an Insurance Company 303 at step 306. Subsequently, the Owner 305 reaches an agreement with a Buyer 301, and the Owner 305 assigns Policy 1 at step 330 to the Buyer 301.

In exchange for this assignment, at step 350, the Buyer 301 purchases Policy 2 from a Second Insurance Company 307 and pays all of the premium payments. At step 340 Policy 2 is issued by the Second Insurance Company 307 to be held by Owner 305. Policy 2 can also be purchased from Insurance Company 303 instead of the Second Insurance Company 307. The Buyer 301 then makes the premium payments for Policy 1 at step 355 and receives the death benefits of Policy 1 at step 360 upon the death of the insured individual.

One of the benefits that results in transaction 300, like transaction 200, is that the Owner 305 eliminates the tax implications from the cash consideration in this transaction, which cash would be required to be reported as taxable income. Instead, the Owner 305 owns a paid-up insurance policy, Policy 2. Upon the death of the individual insured, the Buyer 301 receives the death benefit payment from Policy 1, which in most instances is greater than the death benefit payment of Policy 2. However, the Owner 305, as beneficiary, receives a death benefit from Policy 2 where it would not have otherwise if there had been a lapse or surrender of Policy 1.

Both embodiments 200, 300 as well as the third embodiment discussed below can be implemented manually or automatically through a computer system that is designed to administer and manage the transaction steps automatically, as well as calculate the premiums and face value for the second policy based on actuarial data. A computer based implementation is described in more detail in FIG. 5.

Figure 4:
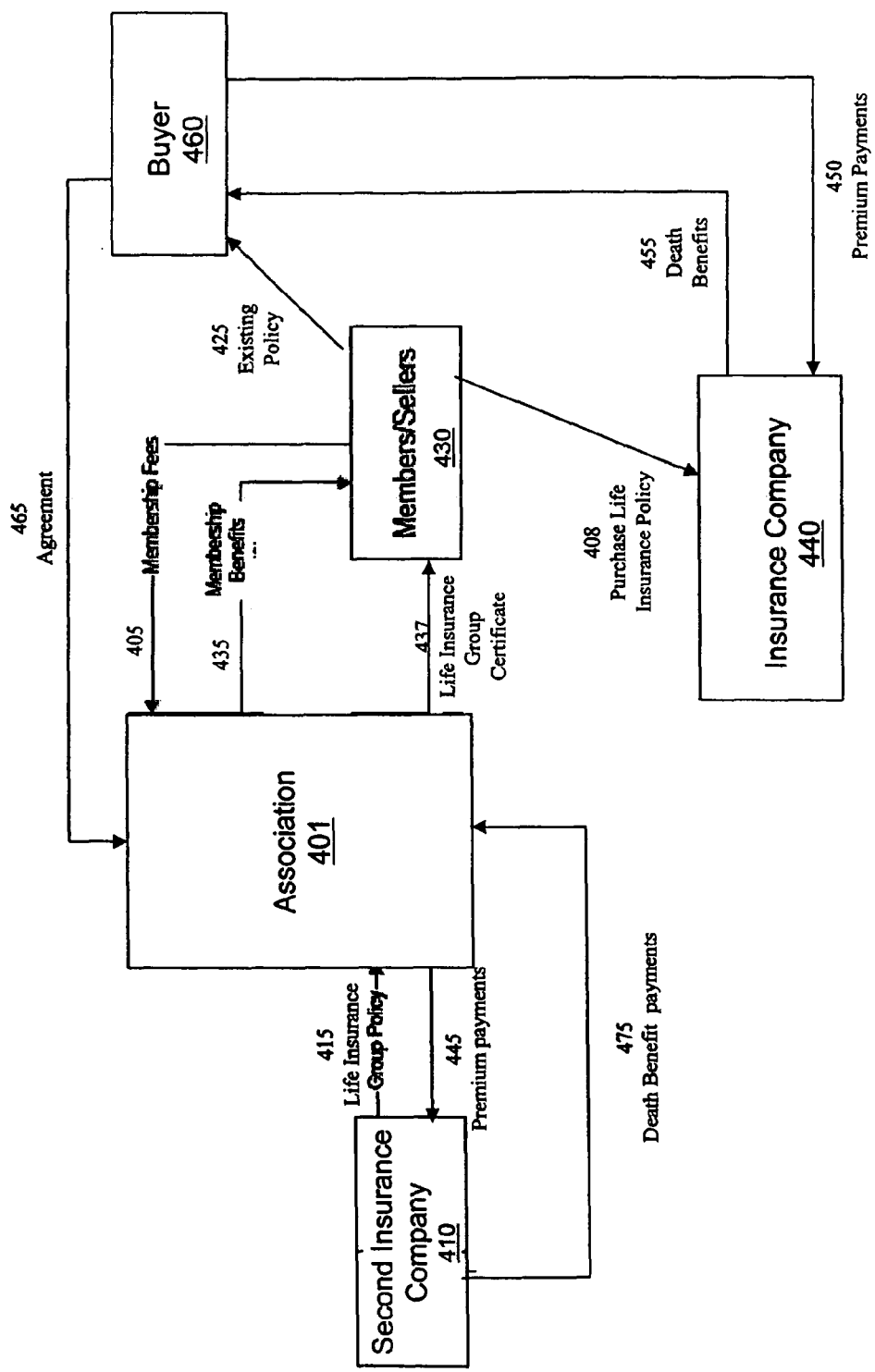
FIG. 4 is a flow chart illustrating a third embodiment of a life settlement transaction according to the present invention.

FIG. 4 illustrates a life settlement transaction 400 according to a third exemplary embodiment of the invention. In this embodiment, the life settlement transaction is similar to life settlement transaction 300; however, an Association or other type of member-based entity 401 is utilized to issue a group life insurance policy covering multiple Members/Sellers 430.

As such, a Buyer 460 purchases at step 425 an existing life insurance policy (Existing Policy) from the owner of the policy, —Member/Seller 430, who had previously purchased the Existing Policy at step 408 from the Insurance Company 440. The Buyer also has in place, or puts in place at step 465, an agreement with the Association 401 for the Buyer to make premium payments, allocate the death benefits that the Buyer receives from the existing Policy, or any other relevant obligations. Accordingly, the Buyer then proceeds to continue to make the premium payments at step 450. Subsequently, at step 405, the Member/Seller 430 becomes part of Association 401 by paying the required membership fees.

In exchange for the Member's 430 membership fees, at step 435, the Member/Seller 430 receives membership benefits, including the ability to receive a Life Insurance Group Certificate (Certificate) 437 in conjunction with assigning the Existing Policy to the Buyer 460. The Certificate represents a paid-up life insurance policy. The paid up life insurance policy is created as follows: at step 415, the Certificate is obtained by the Association 401, which purchases a Life Insurance Group Policy from a Second Insurance Company 410. The Association 401 then makes premium payments 445 on the policy. Alternatively, the group life insurance policy can be purchased by another suitable entity that qualifies as a group insurance purchaser with the selected insurance carrier.

Upon the death of the Member/Seller 430 (or other individual whose life is insured), the Buyer 460 receives the death benefit payment from the Existing Policy at step 455, which preferably is greater than the death benefit payment on the Certificate 475 received by the Association 401 or other suitable entity. However, the Member/Seller 430 or his/her beneficiary (not shown) receives a death benefit in the form of Membership Benefits 435 from the Association 401 where it would not have otherwise due to the lapse or surrender of the Existing Policy.

Figure 5:
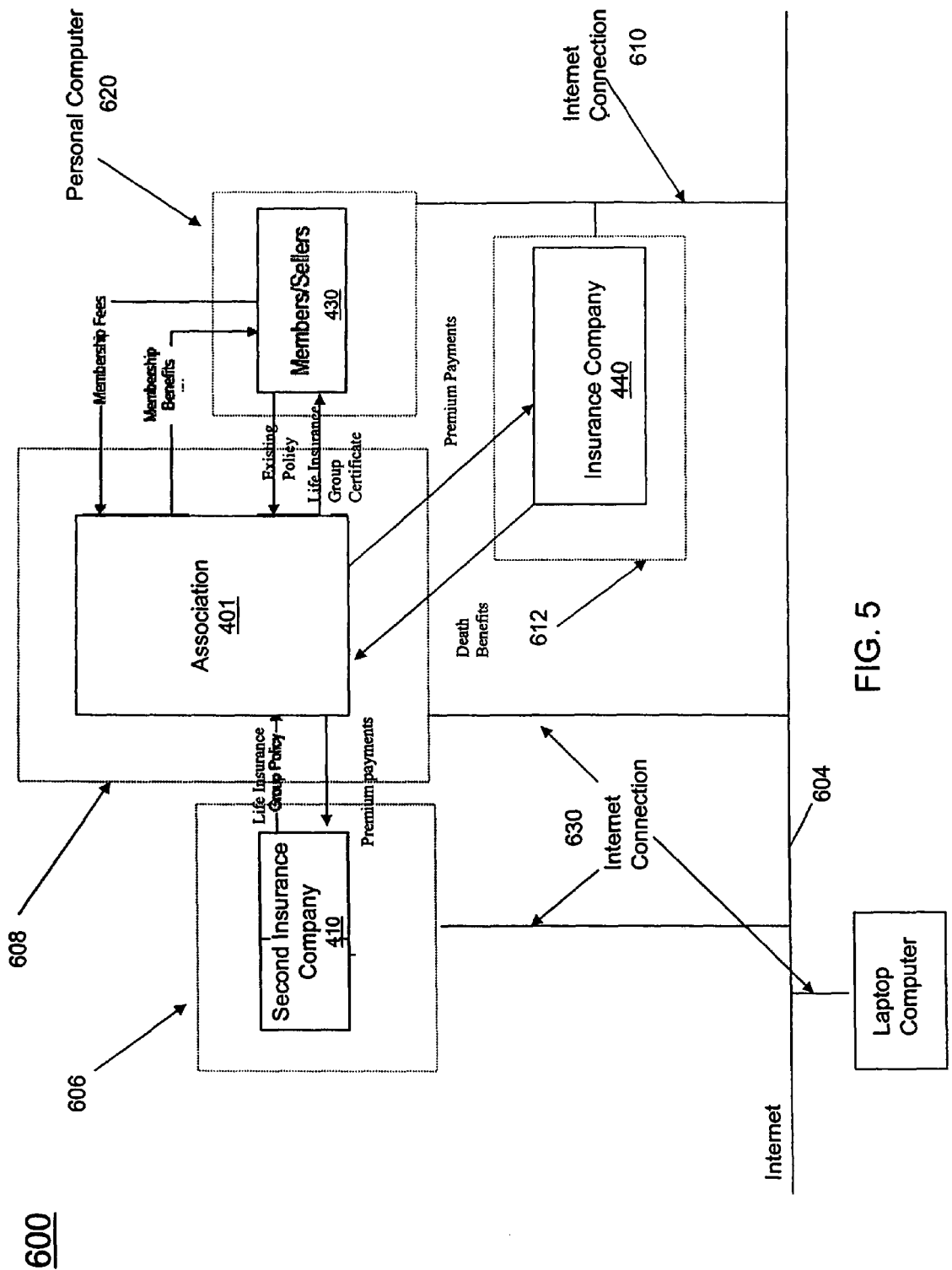
FIG. 5 is a diagram of a processing system implementing the various embodiments of the invention.

As previously noted, FIG. 5 illustrates a computer-based system 600 for implementing the various embodiments of the present invention. It should be understood that each embodiment of the present invention can be implemented manually as well. Computer system 600 is merely an exemplary system, which has the ability to use multiple workstations, servers and personal computers as required. In one embodiment, the system 600 utilizes a pair of servers 606 and 608 and an Internet connection 604, whereby an Insurance Company 440 can communicate electronically with an Association through Internet Connection 610 to conduct a group life insurance policy transaction. Many other configurations, however, can be employed, and this is only one example of an architecture.

In another example, the server and the data from which the server operates can be operated solely by or under the auspices of an insurance carrier 410 or 440. The server can also be relied upon to calculate appropriate levels of insurance to purchase in exchange for the "purchased" policy and the actuarial factors relevant to both policies. In this example, an individual may become an Insured Member by, for example, using a personal computer 620 to communicate over the Internet 604 to a server 608 maintained by the Association 401. In addition, using a server 606 and an internet connection 630, an Insurance Company 410 can communicate with a Buyer 401 or 430 in a single life insurance policy transaction. A general purpose computer having a floppy drive and/or CD-ROM, such as a personal computer, laptop or a workstation may be used by the Insured Member to conduct transactions with the Association and/or Insurance Company (not shown). A computer program for instructing a computer or server to implement the various embodiments of the present invention is loaded onto a computer readable medium, workstation, server or personal computer for use by computer-based system 600.

The above description and drawings illustrate embodiments, which achieve the features and advantages of the present invention. However, it is not intended that the present invention be strictly limited to the above-described and illustrated embodiment. Any modifications, though presently unforeseeable, of the present invention that come within the spirit and scope of the following claims should be considered part of the present invention.

It is well known in the art that any of servers, personal computers or laptop computers (e.g., 604, 606, 608, 612 and 620) can possess at least central processing unit that interprets and executes instructions; input devices, such as a keyboard and a mouse, through which data and commands enter the computer; memory that enables the computer to store programs and data; and output devices, such as printers and display screens, that show the results after the computer has processed data. (Source: The American Heritage® Science Dictionary Copyright, © 2002 by Houghton Mifflin Company).

I claim:

1. A computer-implemented method for conducting a life settlement transaction with a policyholder, comprising:
receiving by a buyer, in exchange for consideration given to a policyholder, an assignment by said policyholder of a first life insurance policy having a first death benefit value on a life of an insured, said consideration having an estimated economic value approximately equal to a life settlement value of said first life insurance policy at the time of the assignment;
   said life settlement value of the first life insurance policy being determined by a computer operated by said buyer and stored, in a memory of said computer;
   selecting, on said computer, a second death benefit value for a second life insurance policy to be purchased on the life of said insured, said second death benefit value being less than said first death benefit value; and
   said buyer purchasing the second life insurance policy to insure the life of said insured, at least part of said consideration being payment on premiums of said second life insurance policy, and said second life insurance policy being issued by someone other than said buyer.

2. The method of claim 1, wherein said second life insurance policy is a paid up life insurance policy.

3. The method of claim 1, further comprising issuing, to said policyholder as owner, said second life insurance policy.

4. The method of claim 1, wherein said second life insurance policy is a group insurance policy.

5. The method of claim 1, wherein said second life insurance policy is purchased from an insurance company different from an insurance company which issued said first life insurance policy.

6. The method of claim 1, wherein said second life insurance policy is purchased from an insurance company which also issued said first life insurance policy.

7. The method of claim 1, wherein said step of receiving is performed by a computer system.

8. The method of claim 7, wherein said computer system includes a component for causing said consideration to be paid to said policyholder by exchanging messages with another computer system over a network.

9. The method of claim 8, wherein said network is an Internet.

10. The method of claim 7, wherein said computer system includes a component for causing submitting said assignment to the issuer of said first insurance company by exchanging messages with another computer system over a network.

11. The method of claim 10, wherein said network is an Internet.

12. The method of claim 7, wherein said computer system includes a component for purchasing said second life insurance policy by exchanging messages with another computer system over a network.

13. The method of claim 12, wherein said network is an Internet.

14. The method of claim 7, wherein said computer system includes a component for estimating an economic value of said first life insurance policy and determining at least one combination of said consideration and characteristics associated with said second life insurance policy at the time when said steps of receiving and causing are performed.

15. The method of claim 14, wherein said characteristics include a face value amount of said second life insurance policy.

16. The method of claim 14, wherein said characteristics include a cash value amount of said second life insurance policy.

17. The method of claim 14, wherein said characteristic include a premium amount of said second life insurance policy.

18. The method of claim 17, wherein said premium amount is a paid up premium amount.

19. The method of claim 4, further comprising said buyer agreeing with said group to comply with an obligation to said group.

20. The method of claim 19, wherein said obligation comprises said buyer's agreeing to make premium payments.

21. The method of claim 19, wherein said obligation comprises said buyer's agreeing to allocate death benefits existing under said first life insurance policy.

22. The method of claim 4, further comprising:
   said policyholder joining said group, if not already a member of said group; and
   said buyer's being eligible to receive benefits from said group, if not already eligible to receive benefits from said group.

23. The method of claim 2, wherein in said buyer causes said policy holder to receive said second life insurance policy.

24. The method of claim 2, wherein in said policyholder is named as the beneficiary of the second life insurance policy.

25. The method of claim 2, wherein in a party other than said policyholder and said buyer is named as the beneficiary of the second life insurance policy.

26. The method of claim 2, wherein said buyer causes said second life insurance policy to be paid up over a period of time.

27. The method of claim 1, wherein said policyholder is a financial beneficiary of said second life insurance policy.

28. The method of claim 1, wherein said policyholder is an owner of said second life insurance policy.

29. The method of claim 1, wherein said policyholder is said insured.

30. The method of claim 1, wherein substantially all of said consideration are premium payments.

31. The method of claim 1, wherein at least part of said premium payments are paid up.

32. The method of claim 1, wherein substantially all of said premium payments are paid up.

33. A system for facilitating life settlement transactions, the system comprising:
   at least one computer, the at least one computer having at least one processor configured to:

receive, for a buyer, in exchange for consideration given to a policyholder, an assignment by the policyholder of a first life insurance policy having a first death benefit value on a life of an insured, the consideration having an estimated economic value approximately equivalent to a life settlement value of the first life insurance policy at the time of the assignment, the life settlement value of the first life insurance policy being determined and stored in a memory of the at least one computer;

select a second death benefit value for a second life insurance policy to be purchased on the life of the insured, the second death benefit value being less than the first death benefit value; and purchase, for the buyer, the second life insurance policy to insure the life of the insured, at least part of the consideration being payment on premiums of the second life insurance policy, and the second life insurance policy being issued by someone other than the buyer.

34. The system of claim 33, wherein the second life insurance policy is a paid up life insurance policy.

35. The system of claim 33, wherein the at least one processor is further configured to issue, to the policyholder as owner, the second life insurance policy.

36. The system of claim 33, wherein the second life insurance policy is a group insurance policy.

37. The system of claim 33, wherein the second life insurance policy is purchased from an insurance company different from an insurance company which issued the first life insurance policy.

38. The system of claim 33, wherein the second life insurance policy is purchased from an insurance company which also issued the first life insurance policy.

39. The system of claim 33, wherein the at least one processor is further configured to cause the consideration to be paid to the policyholder by exchanging messages with another computer over a network.

40. The system of claim 39, wherein the network is an Internet.

41. The system of claim 33, wherein the at least one processor is further configured to submit the assignment to the issuer of the first insurance company by exchanging messages with another computer over a network.

42. The system of claim 41, wherein the network is an Internet.

43. The system of claim 33, wherein the at least one processor is further configured to purchase the second life insurance policy by exchanging messages with another computer over a network.

44. The system of claim 43, wherein the network is an Internet.

45. The system of claim 33, wherein the at least one processor is further configured to estimate an economic value of the first life insurance policy and determine at least one combination of the consideration and characteristics associated with the second life insurance policy.

46. The system of claim 45, wherein the characteristics include a face value amount of the second life insurance policy.

47. The system of claim 45, wherein the characteristics include a cash value amount of the second life insurance policy.

48. The system of claim 45, wherein the characteristic include a premium amount of the second life insurance policy.

49. The system of claim 48, wherein the premium amount is a paid up premium amount.

50. The system of claim 36, wherein the at least one processor is further configured to agree with the group to comply with an obligation to the group.

51. The system of claim 50, wherein the obligation comprises the buyer's agreeing to make premium payments.

52. The system of claim 50, wherein the obligation comprises the buyer's agreeing to allocate death benefits existing under the first life insurance policy.

53. The system of claim 36, wherein the at least one processor is further configured to:

admit the policyholder to the group, if not already a member of the group; and admit the buyer to receive benefits from the group, if not already eligible to receive benefits from the group.

54. The system of claim 34, wherein in the buyer causes the policy holder to receive the second life insurance policy.

55. The system of claim 34, wherein in the policyholder is named as the beneficiary of the second life insurance policy.

56. The system of claim 34, wherein a party other than the policyholder and the buyer is named as the beneficiary of the second life insurance policy.

57. The system of claim 34, wherein the second life insurance policy is paid up over a period of time.

58. The system of claim 33, wherein the policyholder is an owner of the second life insurance policy.

59. The system of claim 33, wherein the policyholder is the insured.

60. The system of claim 33, wherein substantially all of the consideration are premium payments.

61. The system of claim 33, wherein at least part of the premium payments are paid up.

* * * * *